(12) United States Patent
Shioiri et al.

(10) Patent No.: US 9,689,442 B2
(45) Date of Patent: Jun. 27, 2017

(54) SELECTABLE ONE-WAY CLUTCH

(71) Applicant: TOYOTA JIDOSHA KABUSHIKI KAISHA, Toyota-shi, Aichi-ken (JP)

(72) Inventors: Hiroyuki Shioiri, Yokohama (JP); Hideaki Komada, Gotemba (JP); Hiroyuki Shibata, Odawara (JP); Yuki Kurosaki, Susono (JP); Hiroki Yasui, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/198,584

(22) Filed: Jun. 30, 2016

(65) Prior Publication Data
US 2017/0002877 A1    Jan. 5, 2017

(30) Foreign Application Priority Data

Jul. 2, 2015 (JP) ................................. 2015-133302

(51) Int. Cl.
| | |
|---|---|
| *F16D 41/12* | (2006.01) |
| *F16D 41/14* | (2006.01) |
| *F16D 41/02* | (2006.01) |
| *F16D 27/10* | (2006.01) |

(52) U.S. Cl.
CPC .......... *F16D 41/125* (2013.01); *F16D 41/02* (2013.01); *F16D 41/14* (2013.01); *F16D 27/10* (2013.01); *F16D 2300/06* (2013.01)

(58) Field of Classification Search
CPC ........ F16D 41/02; F16D 41/12; F16D 41/125; F16D 41/14; F16D 41/16; F16D 2300/06
See application file for complete search history.

(56) References Cited

U.S. PATENT DOCUMENTS

| | | | |
|---|---|---|---|
| 6,244,965 B1 * | 6/2001 | Klecker et al. ......... | F16D 41/12 192/43.1 |
| 7,721,860 B2 * | 5/2010 | Saka ..................... | F16D 41/125 188/82.3 |
| 2006/0278486 A1 * | 12/2006 | Pawley et al. .......... | F16D 41/12 192/43.1 |

FOREIGN PATENT DOCUMENTS

JP           5120650 B2    1/2013

* cited by examiner

*Primary Examiner* — Richard Lorence
(74) *Attorney, Agent, or Firm* — Andrews Kurth Kenyon LLP

(57) ABSTRACT

A selectable one-way clutch that can prevent unintentional rotation of a selector plate by a drag torque is provided. In the selectable one-way clutch, a selector plate having a first aperture for letting through a strut is interposed between a fixed plate and a rotary plate while being allowed to rotate between an engagement position and a disengagement position. The selectable one-way clutch comprises: a protector plate interposed between the rotary plate and the selector plate; and a second aperture formed on the protector plate to let through the strut when the selector plate is rotated to the engagement position.

4 Claims, 14 Drawing Sheets

SELECTABLE ONE-WAY CLUTCH

CROSS REFERENCE TO RELATED APPLICATIONS

The present application claims the benefit of Japanese Patent Applications No. 2015-133302 filed on Jul. 2, 2015 with the Japanese Patent Office, the disclosure of which is incorporated herein by reference in its entirety.

BACKGROUND

Field of the Disclosure

Preferred embodiment of the present application relates to the art of a selectable one-way clutch adapted to selectively enable torque transmission only in one direction and to interrupt torque transmission in both directions.

Discussion of the Related Art

Japanese Patent Publication No. 5120650 describes a hybrid drive unit having a one-way clutch. According to the teachings of Japanese Patent Publication No. 5120650, in the one-way clutch an outer race connected to a motor-generator is allowed to rotate in the forward direction relatively to an inner race, but the inner race is inhibited to rotate in the counter direction relatively to the outer race.

A conventional selectable one-way clutch is adapted to selectively enable torque transmission only in one direction. To this end, in the selectable one-way clutch, a selector plate interposed between a pocket plate and a notch plate is rotated by an electromagnetic actuator or the like to selectively provide an engagement between the selector plate and the pocket plate. The selectable one-way clutch of this kind may also be used in the hybrid vehicle taught by Japanese Patent No. 5120650 instead of the one-way clutch.

In order to reduce friction, lubrication oil is applied to the selectable one-way clutch to form oil films in friction sites between the pocket plate and the selector plate, and between the selector plate and the notch plate. However, if viscosity of the oil is too high, the selector plate may be rotated undesirably by a drag torque or a shearing force resulting from rotation of the notch plate if the pocket plate is halted. For this reason, the pocket plate may be brought into engagement accidentally with the notch plate if temperature is extremely low.

SUMMARY

Aspects of a preferred embodiment has been conceived noting the foregoing technical problems, and it is therefore an object of the preferred embodiment is to provide a selectable one-way clutch that can prevent an undesirable engagement of the pocket plate to the notch plate by protecting the selector plate from a drag torque applied thereto through lubricating oil during rotation of the notch plate.

According to one aspect of the preferred embodiment, there is provided a selectable one-way clutch, comprising: a fixed plate that is fixed in a manner not to rotate; a rotary plate having a notch that is opposed to the fixed plate while being allowed to rotate relatively to the fixed plate; a lubricating oil that is applied between the fixed plate and the rotary plate; a strut that is held on one face of the fixed plate facing to the rotary plate in a pivotal manner to be selectively engaged with the notch of the rotary plate; and a selector plate having a first aperture for letting through the strut, that is interposed between the fixed plate and the rotary plate while being allowed to rotate within a predetermined range between an engagement position at which the strut is allowed to project toward the rotary plate to be engaged with the notch, and a disengagement position at which the strut is pushed into the fixed plate to be disengaged from the notch. In order to achieve the above-explained objective, according to the preferred example, the selectable one-way clutch is provided with: a protector plate that is interposed between the rotary plate and the selector plate while being fixed in a manner not rotate; and a second aperture that is formed on the protector plate to let through the strut toward the rotary plate when the selector plate is rotated to the engagement position.

In a non-limiting embodiment, the second aperture may be formed to have dimensions substantially identical to those of the first aperture at a position corresponding to that of the strut held on the fixed plate.

In a non-limiting embodiment, the selectable one-way clutch may further comprise a slit formed on the protector plate between the second aperture and an inner circumference of the protector plate.

In a non-limiting embodiment, the selectable one-way clutch may further comprise: a rod member that is connected to an outer circumferential portion of the selector plate to rotate the selector plate within a predetermined range; a cutout formed on the fixed plate to let through the rod member while allowing to rotate within the predetermined range; and a protrusion that protrudes radially outwardly from an outer circumference of the protector plate to be inserted into the cutout while being contacted to width ends of the cutout, and to cover one of the end portions of the arm inserted into a cutout at least partially.

Thus, according to the preferred embodiment, the protector plate is interposed between the rotary plate and the selector plate while being fixed in a manner not rotate. According to the preferred embodiment, therefore, the selector plate can be protected from a drag torque resulting from rotation of the rotary plate applied thereto through the oil. In addition, since the second aperture is formed on the protector plate, a pivotal movement of the strut can be ensured so that an operating mode of the selectable one-way clutch can be switched properly between engagement mode and disengagement mode.

Since the second aperture having dimensions substantially identical to those of the first aperture is formed at a position corresponding to that of the strut, the selector plate can be covered almost entirely by the protector plate to be protected certainly from the drag torque.

Since the slit is formed on the protector plate between the second aperture and the inner circumference, the oil delivered from a rotary shaft on which the rotary plate is fitted can be further delivered centrifugally to the strut and the notch by a rotation of the rotary shaft. According to the preferred embodiment, therefore, the strut can be engaged smoothly with the notch, and the rotary plate can be rotated smoothly on the struts when rotated in an overrunning direction. In addition, since the oil is allowed to flow into a heat generating site such as a clearance between the strut and the rotary plate through the slit, an oil temperature can be suppressed.

Further, since the rod member connected to the selector plate is covered by the protrusion of the selector plate at least partially, the rod member may also be prevented from being rotated by the drag torque to prevent unintentional rotation of the selector plate to the engagement position. In addition, the protector plate can be fixed in the rotational direction without using a pin or the like by the protrusion inserted into the cutout of the fixed plate.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

The selectable one-way clutch (to be abbreviated as the "SOWC" hereinafter) may be applied to a power transmission unit of automobiles. To this end, an operating mode of the SOWC is selectively shifted between an engagement mode and a disengagement mode by rotating a selector plate at a predetermined degree by a linear reciprocating motion of an actuator.

Figure 1:
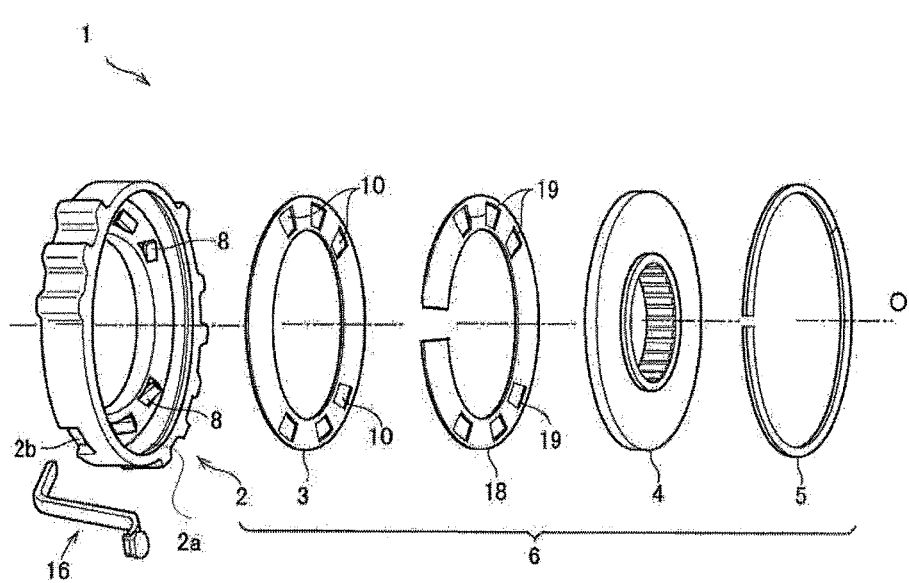
FIG. 1 is an exploded view of the selectable one-way clutch according to the preferred embodiment.

Referring now to FIG. 1, there are shown each part of a body assembly 6 of a selectable one-way clutch (to be abbreviated as the "SOWC" hereinafter) 1 in detail. As shown in FIG. 1, the body assembly 6 of the SOWC 1 comprises a pocket plate 2 as a fixed plate, a selector plate 3, a notch plate 4, and a protector plate 18. The pocket plate 2 comprises an outer cylinder and an annular plate formed along an inner circumference of the cylinder. The selector plate 3, the notch plate 4 and the protector plate 18 are held in a groove 2a formed on an inner circumferential face of the cylinder in the order shown in FIG. 1, and a snap ring 5 is fitted into a clearance between an outer circumference of the notch plate 4 and the inner circumference of the cylinder of the pocket plate 2 to close the pocket plate 2.

Figure 2A:
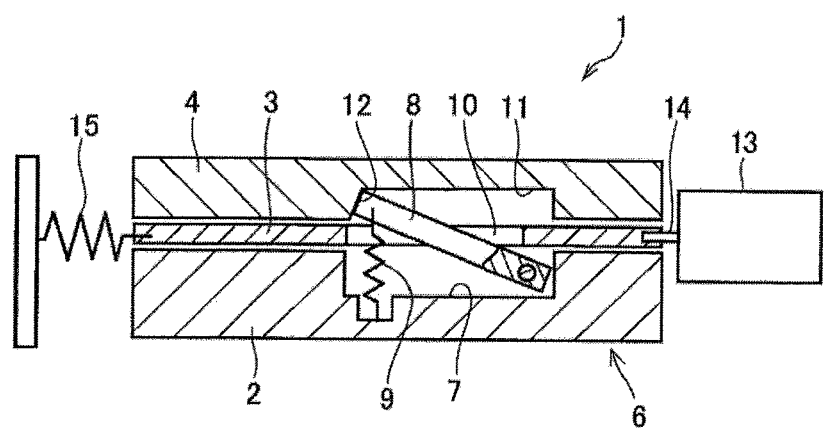
FIG. 2a is a partial cross-sectional view of the selectable one-way clutch in engagement.
Figure 2B:
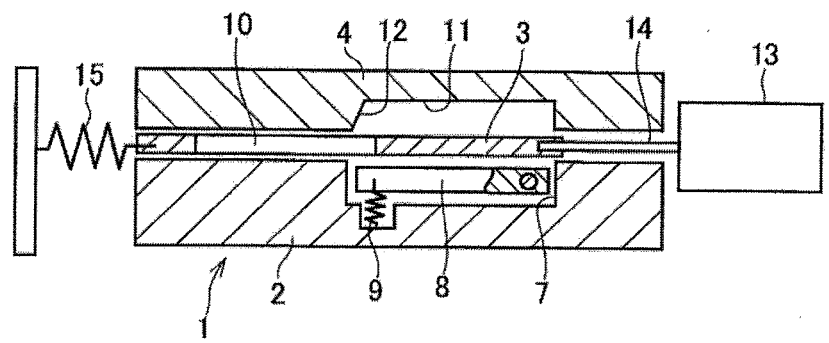
FIG. 2b is a partial cross-sectional view of the selectable one-way clutch in disengagement.

Turning to FIGS. 2a and 2b, there is partially shown a cross-section of the SOWC 1 thus assembled. As illustrated in FIGS. 2a and 2b, a plurality of pockets (or depressions) 7 are formed in a circular manner on a face of the annular plate of the pocket plate 2 being opposed to the notch plate 4, and a rectangular strut 8 as an engagement member is individually held in each pocket 7 in a pivotal manner around one end thereof as a fulcrum. In order to push up the other end (to be called the "leading end" hereinafter) of the strut 8 toward the notch plate 4, a spring 9 is interposed between the leading end of the strut 8 and a bottom of the pocket 7.

The selector plate 3 is an annular member having similar dimensions as the annular plate of the pocket plate 2, and first apertures 10 are formed on the selector plate 3 in a circular manner and in a same number as the pockets 7. As shown in FIG. 2a, when the selector plate 3 is rotated at a predetermined angle in the pocket plate 2 to an engagement position where the first apertures 10 are individually overlapped with each of the pockets 7, the leading end of each strut 8 is allowed to be pushed up by the spring 9 to be brought into engagement with a notch 11 of the notch plate 4. By contrast, when the selector plate 3 is rotated to a disengagement position where the first apertures 10 are individually displaced from each of the pockets 7, each strut 8 is pushed into the pocket 7 by the selector plate 3 as shown in FIG. 2b.

The notch plate 4 as a rotary plate is also an annular member, and the notches 11 as depressions are formed on a face of the notch plate 4 facing to the pocket plate 2 in a circular manner and in the same number as the pockets 7. When the leading end of the strut 8 is pushed into the notch 11 through the first aperture 10, the leading end of the strut 8 is brought into abutment to an engagement wall 12 of the notch 11.

In order to rotate the selector plate 3 between the positions shown in FIGS. 2a and 2b, the SOWC 1 is provided with an actuator 13. The actuator 13 comprises a plunger 14 that is actuated lineally by an electromagnetic force or a hydraulic pressure. According to the example shown in FIGS. 2a and 2b, a solenoid actuator is employed as the actuator 13, and the plunger 14 is constantly pushed by a spring 15. That is, the plunger 14 is elastically pushed out of the actuator 13 by the spring 15 by stopping current supply to the actuator 13 to rotate the selector plate 3 to the disengagement position shown in FIG. 2b. By contrast, the plunger 14 is pulled into the actuator 13 against the elastic force of the spring 15 by energizing the actuator 13 to rotate the selector plate 3 to the engagement position shown in FIG. 2a. Here, it is to be noted that FIGS. 2a and 2b are merely schematic illustrations for explaining a principle of rotating the selector plate 3 by the actuator 13, therefore, an actual structure connecting the actuator 13 and the selector plate 3 is different from that shown in FIGS. 2a and 2b. Specifically, as described later, the spring 15 is fitted onto the plunger 14 in such a manner as to push a leading end of the plunger 14.

Turning back to FIG. 1, the selector plate 3 and the actuator 13 are connected through an arm 16 as a cranked rod member. One of the end portions of the arm 16 is inserted into a cutout (or a through hole) 2b of the pocket plate 2 from outside to be connected to the selector plate 3 in such a manner as to be rotated integrally therewith, and the other end portion of the arm 16 is connected to the plunger 14. Specifically, when the actuator 13 is activated so that the plunger 14 is pulled into the actuator 13, or when the actuator 13 is inactivated so that the plunger 14 is pushed out of the actuator 13 by the spring 15, the arm 16 is rotated by such reciprocating motion of the plunger 14 within a predetermined range.

Figure 3:
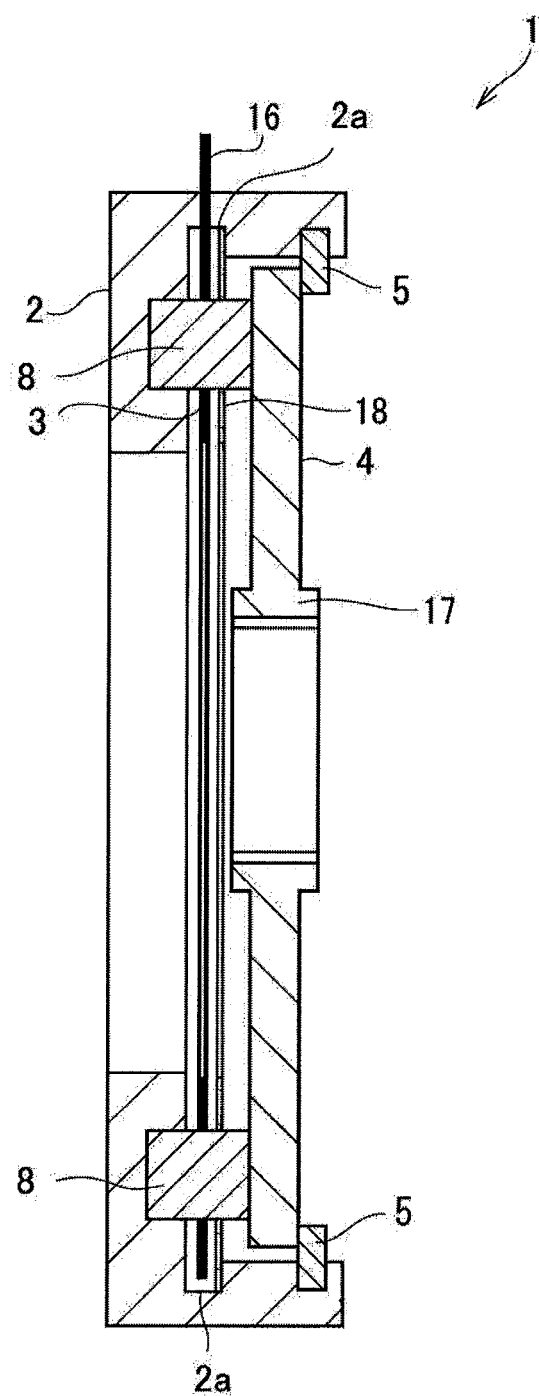
FIG. 3 is a cross-sectional view of the selectable one-way clutch according to the preferred embodiment.
Figure 4:
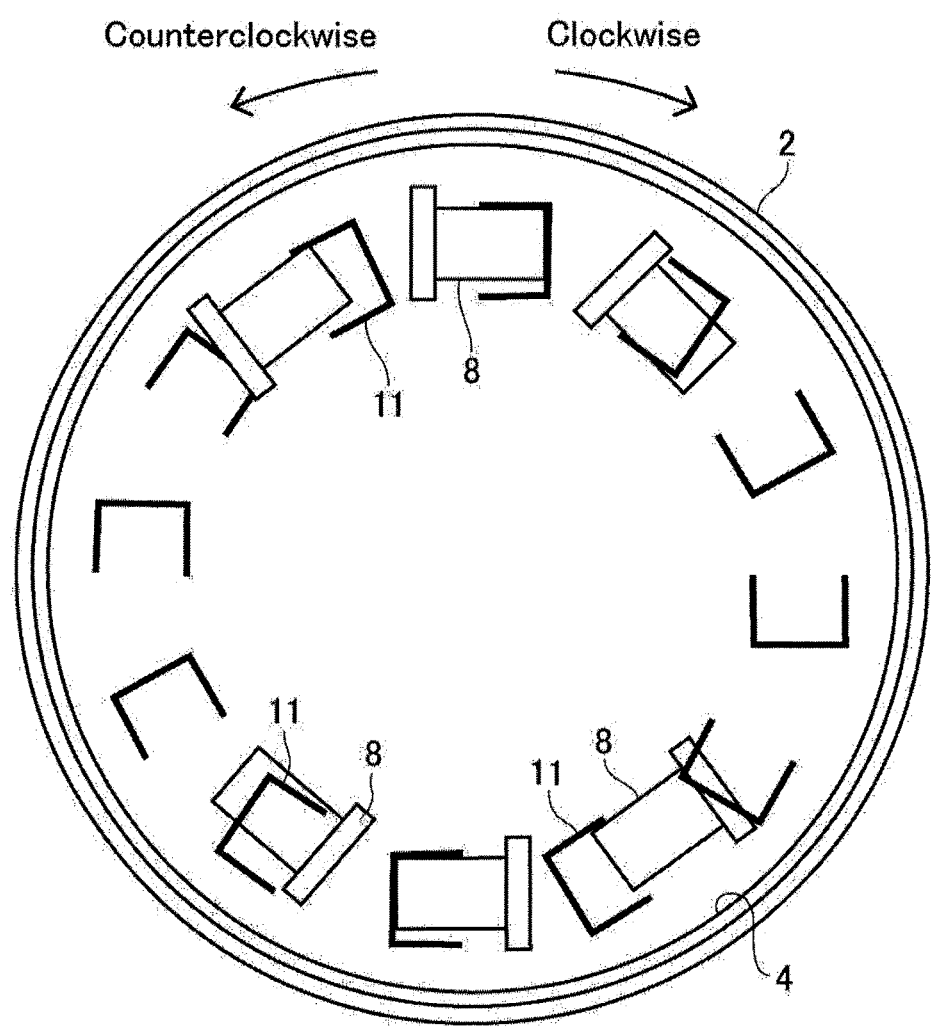
FIG. 4 is a front view showing the selectable one-way clutch in which the pocket plate is engaged with the notch plate.

Turning to FIG. 3, there is shown a cross-section of the SOWC 1 in more detail. A not shown rotary shaft is inserted into a spline groove 17 of the notch plate 4 from an opposite side of the selector plate 3 so that the notch plate 4 is rotated by a rotation of the rotary shaft. As described, when the selector plate 3 is rotated to the aforementioned engagement position, the struts 8 are allowed to be pushed up into the notches 11 of the notch plate 4. In this situation, if the rotary shaft is rotated counterclockwise (i.e., in the forward direction) as illustrated in FIG. 4, the notch plate 4 is also rotated counterclockwise so that the leading end of each of the strut 8 is brought into contact to the engagement wall 12 of the notch 11. Consequently, the SOWC 1 is brought into the engagement mode to transmit torque in the forward direction. By contrast, if the rotary shaft is rotated clockwise (i.e., in the backward direction) as also illustrated in FIG. 4, the notch plate 4 is also rotated clockwise while pushing the struts 8 into the pockets 7 of the pocket plate 2 without transmitting torque. That is, the SOWC 1 is brought into the disengagement mode. However, if the selector plate 3 is situated at the disengagement position, the selector plate 3 may be rotated unintentionally to the engagement position by a drag torque resulting from forward rotation of the notch plate 4 through the oil. In order not to rotate the selector plate 3 unintentionally by the drag torque, the protector plate 18 is interposed between the selector plate 3 and the notch plate 4 to protect the selector plate 3 from the drag torque applied thereto through the oil.

Figure 5:
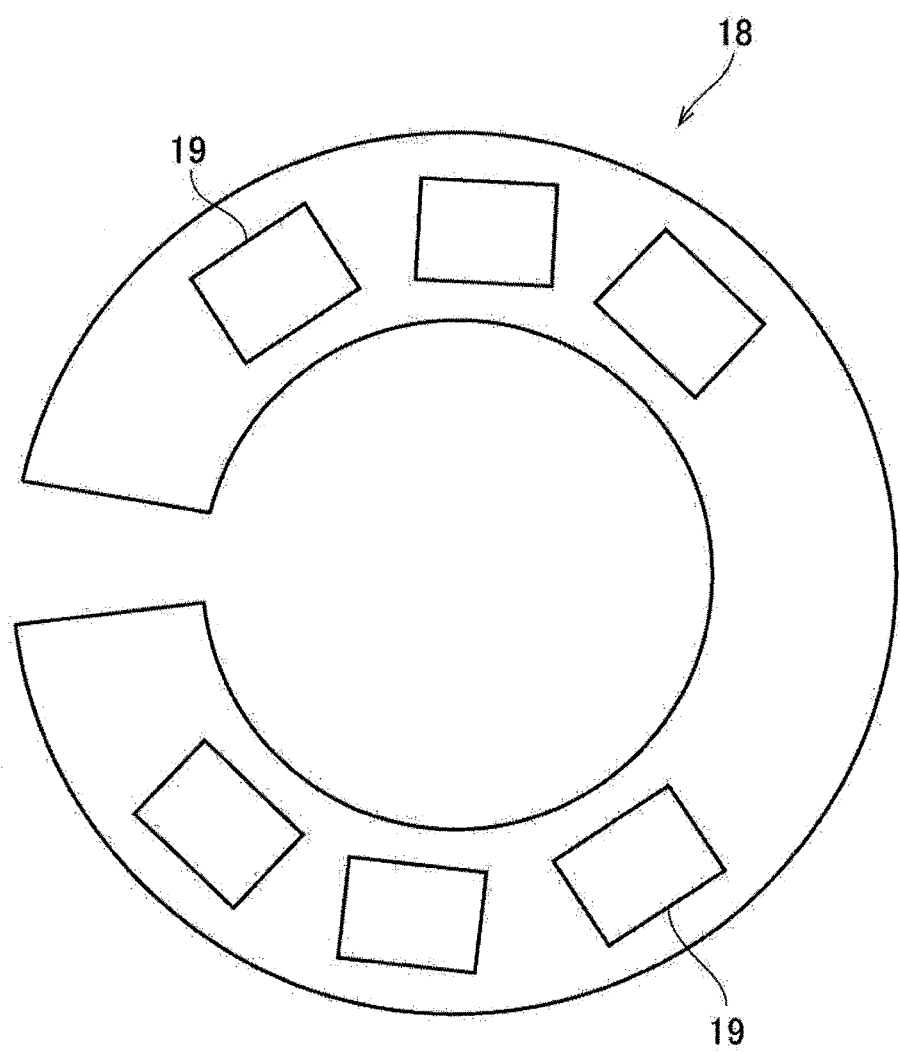
FIG. 5 is a front view showing a first example of the protector plate.

Turning to FIG. 5, there is shown a first example of the protector plate 18. As depicted in FIG. 5, the protector plate 18 is a C-shaped annular plate formed of a cold-roll steel plate having a cutout, and an outer diameter of the protector plate 18 is substantially identical to or slightly smaller than an inner diameter of the groove 2a. As described, the protector plate 18 is interposed between the selector plate 3 and the notch plate 4, and fixed by a not shown pin or the like in such a manner not to be rotated by the drag torque resulting from rotation of the notch plate 4.

Figure 6:
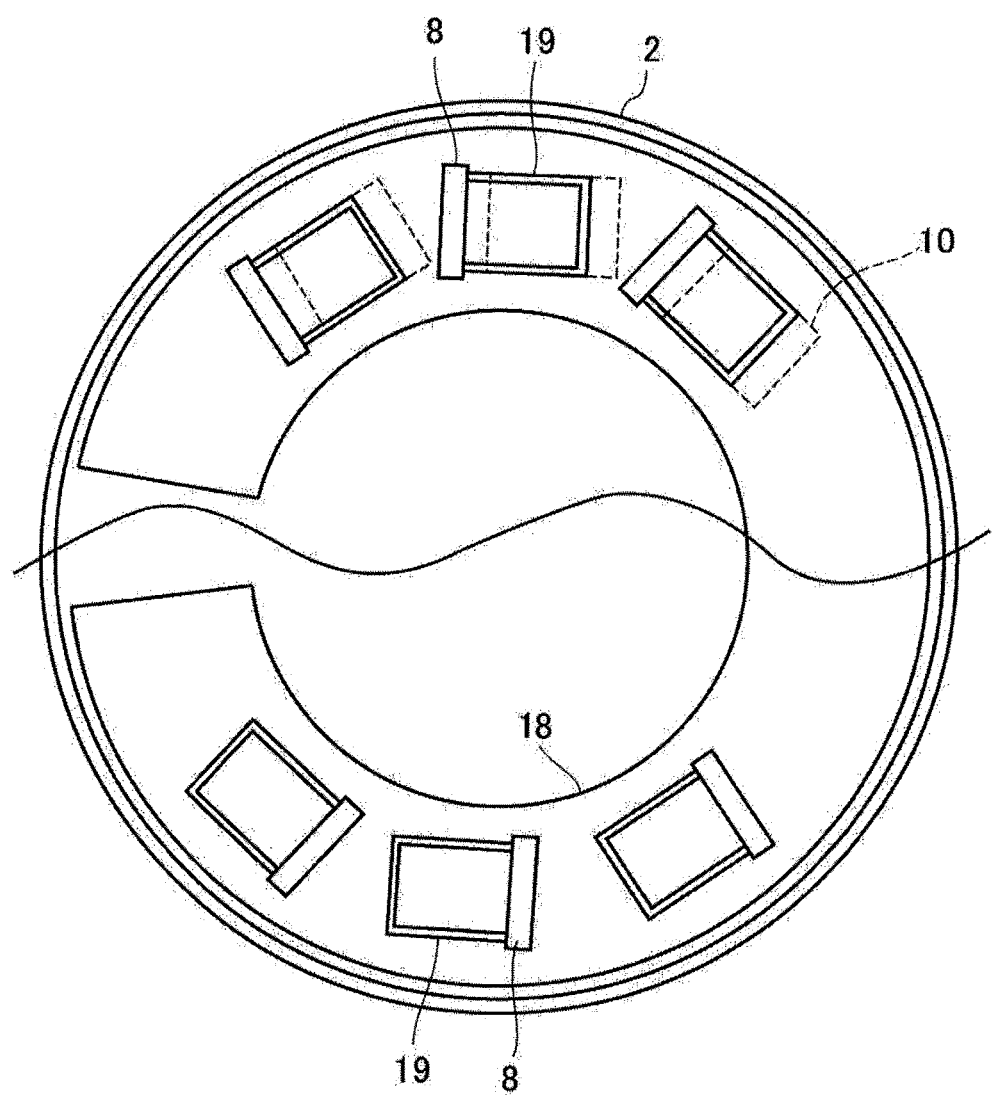
FIG. 6 is a schematic illustration showing the protector plate according to the first example attached to the pocket plate, in which the upper section shows an engagement mode, and in which the lower section shows a disengagement mode.
Figure 7:
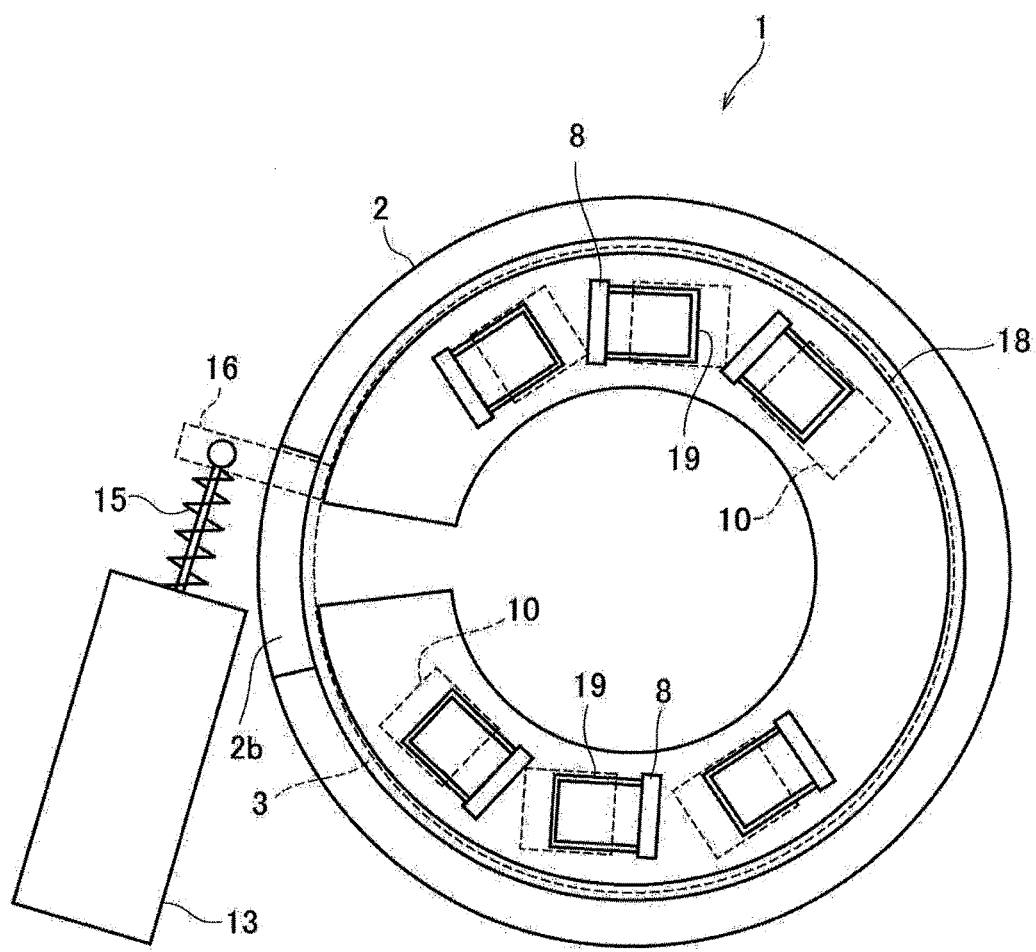
FIG. 7 is a schematic illustration showing a situation in which the selector plate is rotated to the disengagement position by the actuator in the selectable one-way clutch having the protector plate according to the first example.

Second apertures 19 are formed on the protector plate 18 in a circular manner and in a same number as the pockets 7 individually holding the struts 8 therein. As illustrated in FIGS. 6 and 7, dimensions of each of the second aperture 19 is substantially identical to those of the first aperture 10 of the selector plate 3, and formed at a position individually corresponding to each position of the strut 8 held in the pocket 7 of the pocket plate 2. In the SOWC 1, therefore, each of the struts 8 is allowed to be pushed up by the spring 9 into the notch 11 when the selector plate 3 is rotated to the engagement position.

Since the protector plate 18 is thus interposed between the selector plate 3 and the notch plate 4 while being fixed, the selector plate 3 can be prevented from being subjected directly to the drag torque resulting from rotation of the notch plate 4 through the oil. In addition, the oil will not be applied excessively to the selector plate 3 even if the oil is agitated by a rotation of the notch plate 4.

Moreover, since dimensions of each of the second aperture 19 is substantially identical to those of the first aperture 10 of the selector plate 3, an overlapping area between the selector plate 3 and the protector plate 18 can be maintained as much as possible. For this reason, the selector plate 3 can be prevented more certainly from being rotated undesirably by a drag torque resulting from rotation of the notch plate 4 through the oil.

Further, a surface of the protector plate 18 opposed to the selector plate 3 may be finished to reduce surface roughness. In the SOWC 1, it is difficult to apply a surface treatment to a lateral face of the groove 2a of the pocket plate in which the protector plate 18 is fitted, but the surface of the protector plate 18 can be finished easily to reduce a roughness thereof. In this case, therefore, a resistance against the rotation of selector plate 3 can be reduced so that the selector plate 3 is allowed to be rotated smoothly without increasing a capacity of the actuator. For this reason, it is not necessary to use a larger actuator and hence a size growth of the SOWC 1 can be prevented.

Furthermore, since the protector plate 18 has the cutout, the protector plate 18 can be buckled to be diametrically shrunk. For this reason, the protector plate 18 can be fitted easily into the groove 2a formed on the cylinder of the pocket plate 2 by bucking the protector plate 18 when inserting into the cylinder and then releasing the protector plate 18 in the groove 2a.

Figure 8:
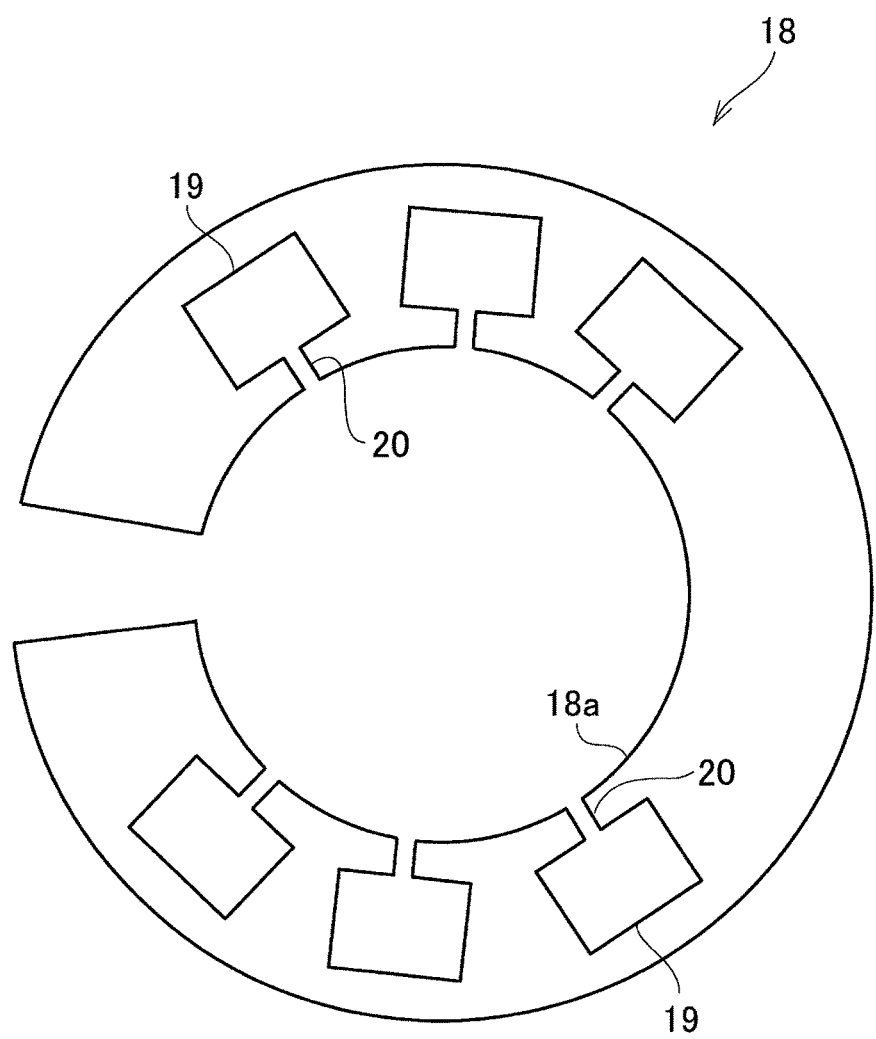
FIG. 8 is a front view showing a second example of the protector plate.
Figure 9:
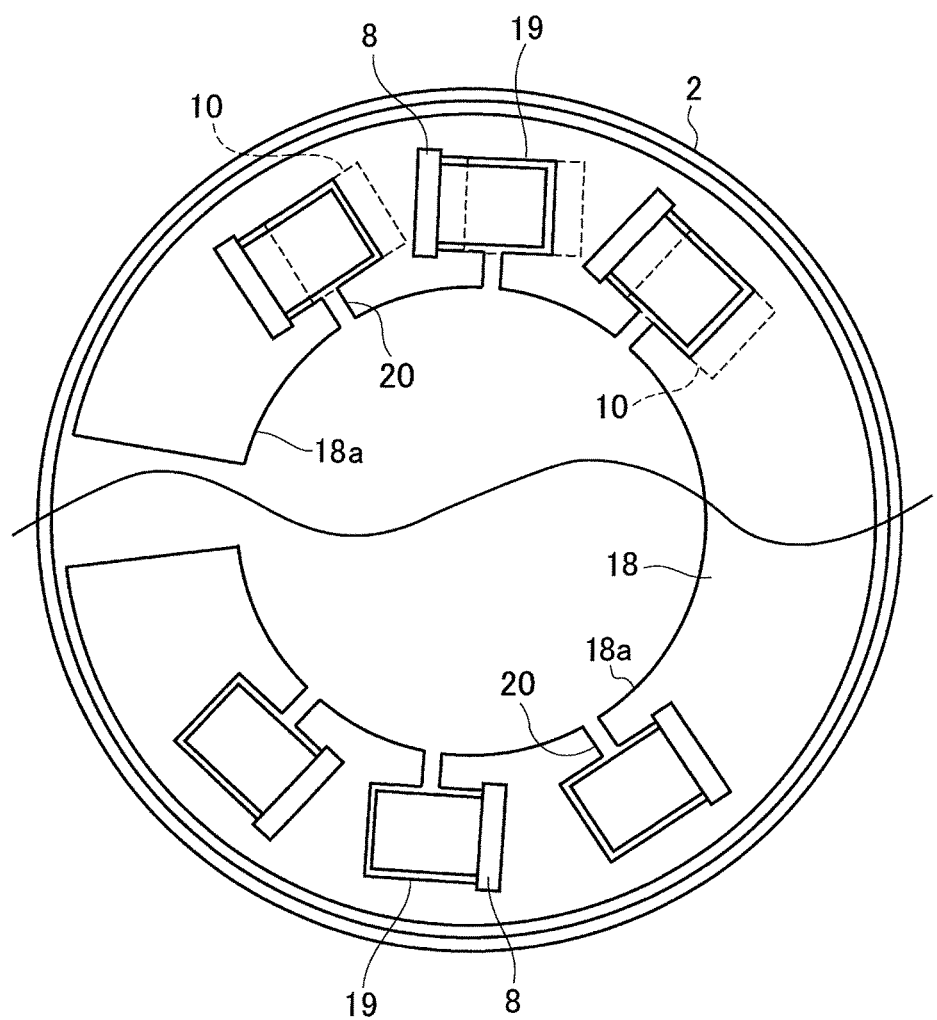
FIG. 9 is a schematic illustration showing the protector plate according to the second example attached to the pocket plate, in which the upper section shows an engagement mode, and in which the lower section shows a disengagement mode.

Here will be explained a second example of the present application with reference to FIGS. 8 and 9. In the example shown in FIGS. 8 and 9, a slit 20 is formed on the protector plate 18 from the second aperture 19 to an inner circumference 18a of the protector plate 18 so that the oil delivered from the rotary shaft on which the notch plate 4 is fitted can be further delivered to the pocket 7 and the notch 11 through the slit 20 centrifugally by a rotation of the rotary shaft. According to the second example, therefore, the strut 8 can be smoothly engaged with the engagement wall 12 of the notch 11, and the notch plate 4 can be rotated smoothly on the struts 8 when rotated in the overrunning direction. In addition, since the oil is allowed to flow into a heat generating site such as a clearance between the strut 8 and the notch plate 4 through the slit 20, increase in an oil temperature can be suppressed.

Figure 10:
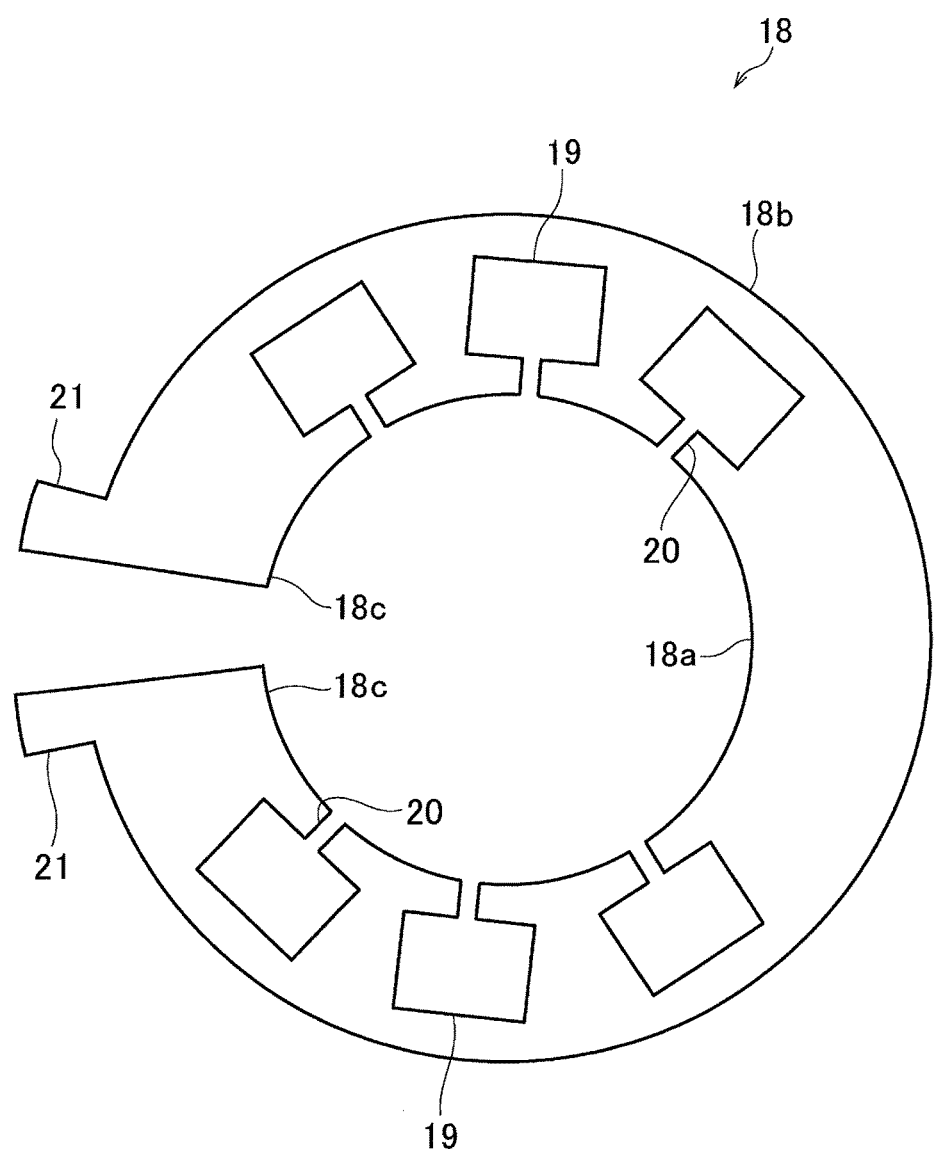
FIG. 10 is a front view showing a third example of the protector plate.
Figure 11:
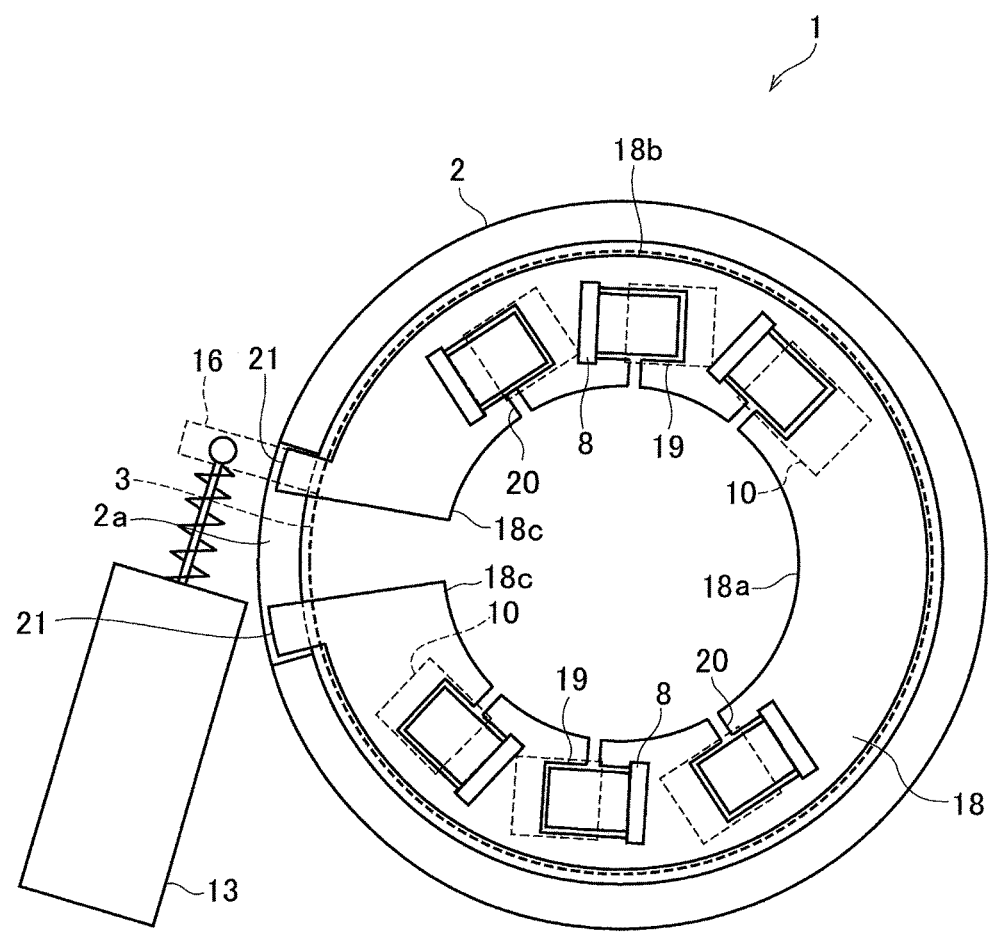
FIG. 11 is a schematic illustration showing a situation in which the selector plate is rotated to the disengagement position by the actuator in the selectable one-way clutch having the protector plate according to the third example.

Turning to FIGS. 10 and 11, there is shown a third example of the protector plate 18. In the example shown in FIGS. 10 and 11, in order to reduce the number of parts of the SOWC 1, a protrusion 21 is formed on each end portion 18c of the protector plate 18 in such a manner as to protrude radially outwardly from an outer circumference 18b. As illustrated in FIG. 11, in the pocket plate 2, those protrusions 21 are inserted into the cutout 2b of the pocket plate 2 while being contacted to width ends of the cutout 2b so that an undesirable rotation of the protector plate 18 can be stopped at the width ends of the cutout 2b. According to the third example, therefore, the protector plate 18 can be fixed in the rotational direction without using a pin or the like.

Figure 12:
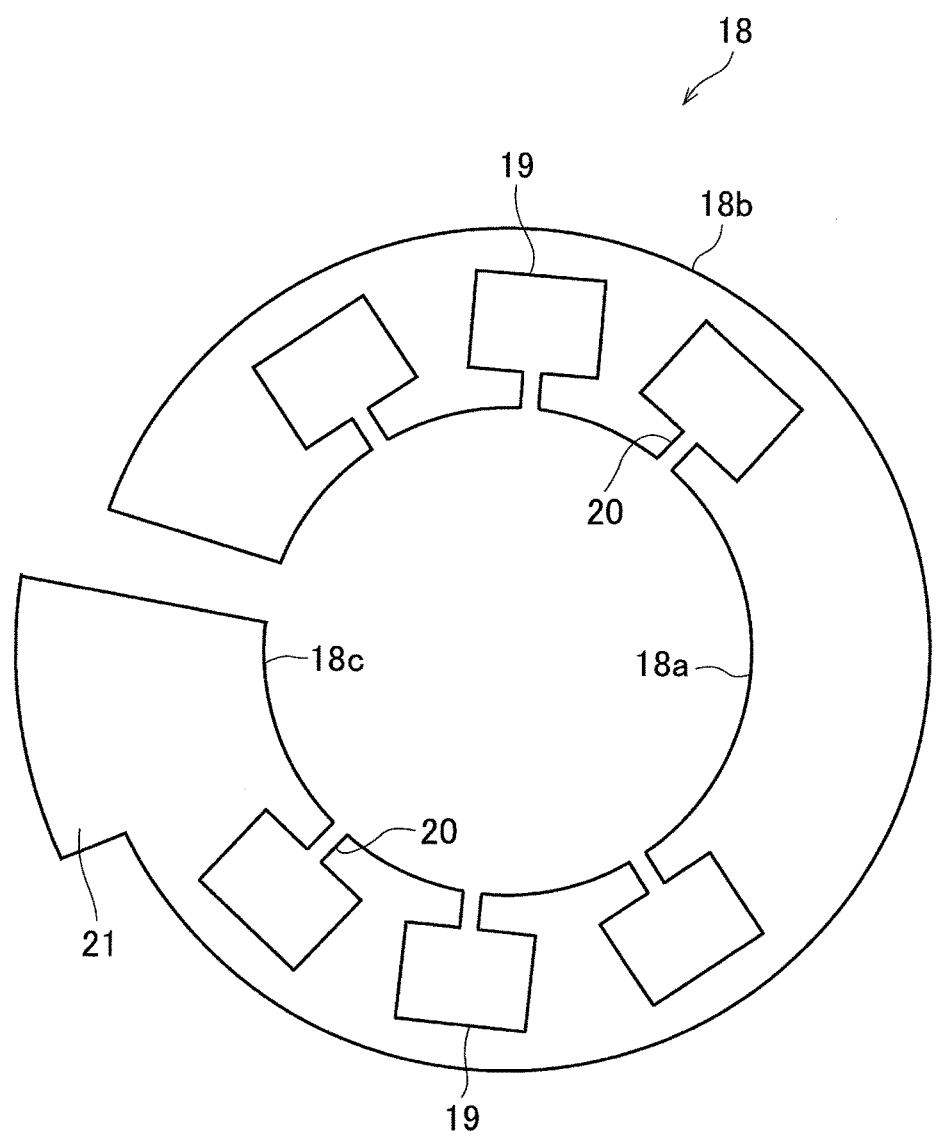
FIG. 12 is a front view showing a fourth example of the protector plate.

As illustrated in FIG. 12, according to the fourth example of the protector plate 18, the protrusion 21 may also be formed only on one of the end portion 18c of the protector plate 18. In this case, both width ends of the protrusion 21 come into contact to the width ends of the cutout 2b to stop the rotation of the protector plate 18. According to the fourth example, therefore, number of parts of the SOWC 1 may also be reduced.

In addition, in the examples having the protrusion 21, one of the end portions of the arm 16 inserted into the cutout 2b can be covered at least partially by the protrusion(s) 21. For this reason, the arm 16 can be prevented from being subjected to a drag torque through the oil resulting from a rotation of the notch plate 4 thereby preventing an undesirable engagement of the strut 8 with the notch 11.

Figure 13:
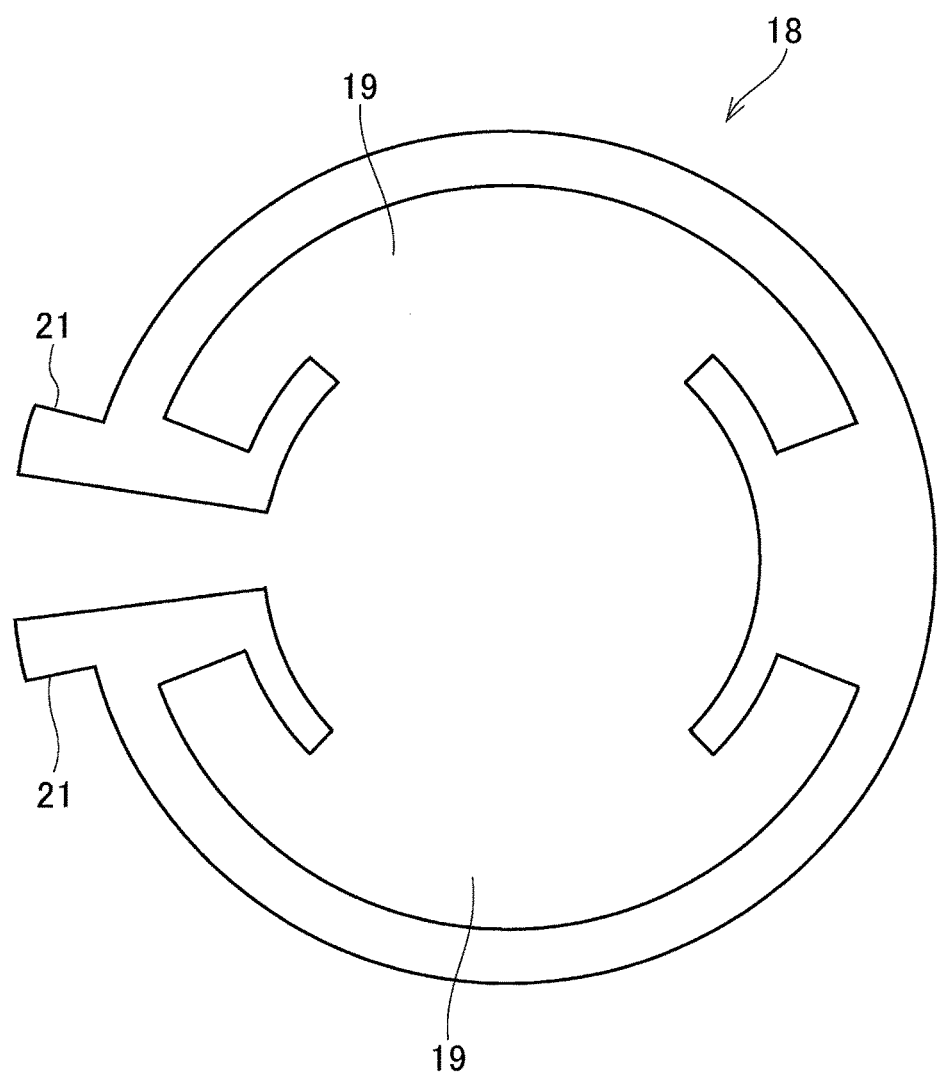
FIG. 13 is a front view showing a fifth example of the protector plate.
Figure 14:
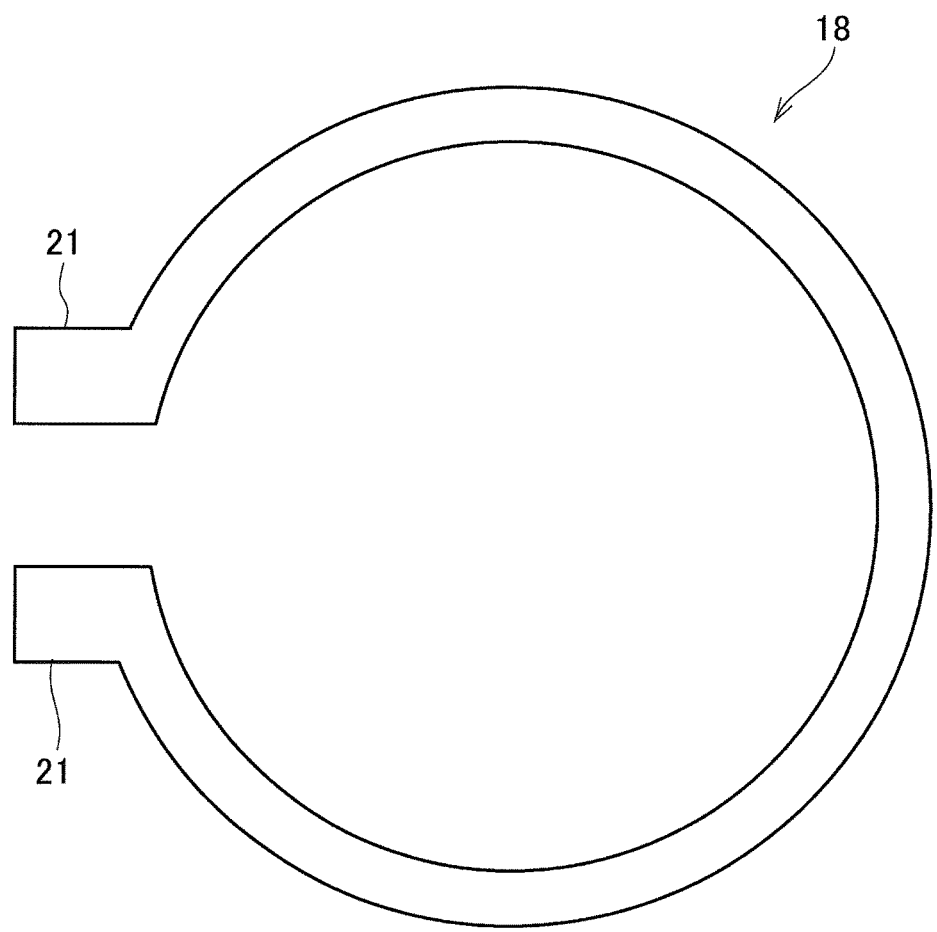
FIG. 14 is a front view showing a sixth example of the protector plate.

As illustrated in FIG. 13, according to the fifth example of the protector plate 18, the second aperture 19 may also be formed into an arcuate shape having a predetermined circumferential length. In this case, a plurality of the struts 8 are allowed to be pushed up therethrough to be engaged with the notches 11 when the selector plate 3 is rotated to the engagement position. According to the fifth example, therefore, a number of the second aperture 19 can be reduced and hence the protector plate 18 can be manufactured easily.

As illustrated in FIG. 13, according to the sixth example of the protector plate 18, the protector plate 18 may also be formed without the second apertures 19. In this case, the selector plate 3 may also be protected from the drag torque resulting from rotation of the notch plate 4, and the protector plate 18 may be manufactured further easily. In addition to the foregoing examples, the protector plate 18 may also be comprised of a first rim situated in an inner circumferential side of the second apertures 19, and a second rim situated in an outer circumferential side of the second apertures 19. In this case, the first rim and the second rim may be connected to each other at a predetermined point(s) but also be situated in different axial positions.

Although the above exemplary embodiments of the present application have been described, it will be understood by those skilled in the art that the present application should not be limited to the described exemplary embodiments, and various changes and modifications can be made within the spirit and scope of the present application. For example, in order to prevent rotation of the protector plate 18, the protector plate 18 may also be formed to have an outer diameter identical to an inner diameter of the groove 2a of the pocket plate 2.

What is claimed is:

1. A selectable one-way clutch, comprising:
   a fixed plate that is fixed in a manner not to rotate;
   a rotary plate having a notch that is opposed to the fixed plate while being allowed to rotate relatively to the fixed plate;
   a lubricating oil that is applied between the fixed plate and the rotary plate;
   a strut that is held on one face of the fixed plate facing to the rotary plate in a pivotal manner to be selectively engaged with the notch of the rotary plate;
   a selector plate having a first aperture for letting through the strut, that is interposed between the fixed plate and the rotary plate while being allowed to rotate within a predetermined range between an engagement position at which the strut is allowed to project toward the rotary plate to be engaged with the notch, and a disengagement position at which the strut is pushed into the fixed plate to be disengaged from the notch;
   a protector plate that is interposed between the rotary plate and the selector plate while being fixed in a manner not to rotate; and
   a second aperture that is formed on the protector plate to let through the strut toward the rotary plate when the selector plate is rotated to the engagement position.

2. The selectable one-way clutch as claimed in claim 1, wherein the second aperture is formed to have dimensions substantially identical to those of the first aperture at a position corresponding to that of the strut held on the fixed plate.

3. The selectable one-way clutch as claimed in claim 2, further comprising:
   a slit formed on the protector plate between the second aperture and an inner circumference of the protector plate.

4. The selectable one-way clutch as claimed in claim 2, further comprising:
   a rod member that is connected to an outer circumferential portion of the selector plate to rotate the selector plate within a predetermined range;
   a cutout formed on the fixed plate to let through the rod member while allowing to rotate within the predetermined range; and
   a protrusion that protrudes radially outwardly from an outer circumference of the protector plate to be inserted into the cutout while being contacted to width ends of the cutout, and to cover one of the end portions of the arm inserted into a cutout at least partially.

* * * * *